United States Patent [19]

Clampitt

[11] B 3,993,133

[45] Nov. 23, 1976

[54] SELECTIVE PLUGGING OF FORMATIONS WITH FOAM

[75] Inventor: Richard L. Clampitt, Bartlesville, Okla.

[73] Assignee: Phillips Petroleum Company, Bartlesville, Okla.

[22] Filed: Apr. 18, 1975

[21] Appl. No.: 569,519

[44] Published under the second Trial Voluntary Protest Program on February 3, 1976 as document No. B 569,519.

[52] U.S. Cl. .............................. 166/272; 166/263; 166/270; 166/288

[51] Int. Cl.² .................. E21B 43/22; E21B 43/24; E21B 33/138

[58] Field of Search ............ 166/272, 288, 263, 270

[56] References Cited
UNITED STATES PATENTS

| | | | |
|---|---|---|---|
| 3,204,694 | 9/1965 | Johnson | 166/272 X |
| 3,373,814 | 3/1968 | Eilers et al. | 166/288 |
| 3,412,793 | 11/1968 | Needham | 166/272 X |
| 3,530,940 | 9/1970 | Dauben et al. | 166/305 R |
| 3,682,244 | 8/1972 | Bowman et al. | 166/272 X |
| 3,727,687 | 4/1973 | Clampitt et al. | 166/274 |
| 3,785,437 | 1/1974 | Clampitt et al. | 166/281 |

*Primary Examiner*—Stephen J. Novosad
*Assistant Examiner*—George Suckfield

[57] ABSTRACT

An improved process for decreasing the permeability of a subterranean oil-bearing formation which comprises injecting an aqueous surfactant solution containing a chemically crosslinkable, water-dispersible polymer which prevents the surfactant from foaming until it is in the formation and after the polymer breaks down due to heat in the formation caused by steam which is used to carry the aqueous solution into the formation. In accordance with one embodiment, gelled or ungelled cellulose ether polymers in an aqueous surfactant solution are injected with steam into the more permeable or more depleted portions of a subterranean oil-bearing formation to produce a selective blocking due to the formation of foam in the more permeable sections of the formation which forces the remaining injection steam to produce oil from less depleted portions of the formation.

7 Claims, No Drawings

SELECTIVE PLUGGING OF FORMATIONS WITH FOAM

This invention relates to an improved process for decreasing the permeability of subterranean oil-bearing formations. In accordance with another aspect, this invention relates to the selective blocking or plugging of highly permeable channels or sections of subterranean formations by injecting an aqueous surfactant solution containing a gelled or ungelled polymer, such as a cellulose ether polymer, with steam either through an injection well or a production well. In accordance with another aspect, a process is provided for increasing the resistance to fluid flow over a longer period of time by injecting an aqueous surfactant solution containing a chemically crosslinkable, water-dispersible polymer, such as polyacrylamides and related polymers, cellulose ethers, and polysaccharides, into a formation in a steam- or gas-foamed system.

In oil well production, it is quite common to inject various gases, including steam, into oil wells to increase the production of oil from those wells. One common method of increasing production is the cyclic steam stimulation method wherein production of oil from the well is periodically interrupted and steam is injected in the well. Steam serves to melt some of the waxes in the strata and reduce the viscosity of the oil surrounding the wellbore so that it will flow more readily into the wellbore and be produced therefrom. A second method is the direct drive injection of steam or other gases continuously into one well whereby oils in the various earth strata are pushed ahead of the steam or gas being injected and are produced from another nearby well.

One of the problems faced in either type of injection of gases or steam into the well arises from the varying permeability of the different earth strata. Where there is a considerable difference in the permeability of different strata, the injected gas will flow into the more permeable strata preferentially or, on occasion, almost exclusively. Since the oil to be produced may be very largely in the less permeable strata, a considerable quantity of gas or steam will be injected into the well with little success.

Various methods of plugging or sealing off the highly permeable strata so that the steam may be directed into the less permeable strata have been proposed. One method which has been proposed is the introduction of foam into the more permeable strata by pumping into the well a water solution of a surface-active agent. Another method involves introducing steam and a foaming agent into the formation whereby a foam having steam as its gaseous phase is formed, and, upon condensation of the steam due to loss of heat, the foam collapses. The present invention is directed to an improved process for increasing the resistance to fluid flow over a longer period of time when using steam and a foaming agent which foams having steam as its gaseous phase by injecting along with the surface-active agent and foam by incorporating the agent therein which prevents the surface-active agent from foaming until it is in the formation and after the added agent breaks down due to heat.

Accordingly, an object of this invention is to provide for the production of oil from an oil-bearing formation or stratum.

It is another object of this invention to increase the efficiency of oil recovery from such a formation.

Another object of this invention is to provide a method for sealing portions of a formation which have a relatively high permeability which interferes with the use of a driving force to force oil from less permeable portions of the formation.

A further object of this invention is to provide a fuller pressure, e.g., steam direct drive system, for producing oil from an oil-bearing formation.

Another object of this invention is to provide a method for temporarily plugging permeable strata.

It is a further object of this invention to provide a process for producing a well by plugging more permeable strata with a self-destructive foam.

Other objects, aspects, and the several advantages of the invention will be apparent to those skilled in the art upon reading the specification and the appended claims.

In accordance with the invention, the above and other objects of the invention are accomplished by injecting steam into subterranean oil-bearing formations together with an aqueous surfactant solution containing a chemically crosslinkable, water-dispersible polymer which prevents the surfacant from foaming until after it is in the formation and after the polymer breaks down due to heat in the formation. After the polymer breaks down, the surfactant forms a self-collapsing foam having a condensable gas as its gaseous phase.

The polymers used according to the invention perform a twofold purpose in that the surfactants are prevented from foaming due to being coated with the polymer around the surfactant materials until after the polymer breaks down from heat, and the surfactants do not degrade chemically due to heat from the steam while the surfactant is coated with polymer and being injected along with steam into the formation. This discovery should allow greater and better use of surfactants in the polymer-condensable foam treatment of wells for diversion purposes and thus cause the steam to go to the less depleted zones containing the oil remaining in the reservoir.

More specifically, according to the invention, an aqueous surfactant solution containing at least one chemically crosslinkable, at least water-dispersible polymer selected from polyacrylamides and related polymers, cellulose ethers, and polysaccharides which can be crosslinked or gelled in an aqueous medium with catalytic gelling agents are injected with steam into subterranean oil-bearing formations under conditions which produce a selective blocking due to the formation of foam in the more permeable sections of the formation which forces injection steam to produce oil from less depleted portions of the formation.

In accordance with one specific embodiment, gelled or ungelled cellulose ether polymers and surfactants are injected with steam into a subterranean oil-bearing formation through a well to divert the steam to the zones containing oil. As indicated above, the polymers prevent the surfactants from foaming until these materials are in the formation while serving to plug the more porous zones until the polymers are broken down by heat.

In accordance with one presently preferred embodiment of the invention, an aqueous surfactant solution containing a gelled cellulose ether polymer is injected with steam into a formation either through an injection well or a production well to selectively plug or block the more depleted portions of the formation and thereby force the remaining steam to produce oil from the less depleted portions of the formation.

As indicated hereinbefore, it is presently preferred to use gelled cellulose ether polymers in combination with foamable surfactants to reduce channeling in steam drive systems and subterranean oil-bearing formations. Other polymers such as polyacrylamides and related polymers and polysaccharides which can be crosslinked or gelled in an aqueous medium can be used with and/or instead of cellulose ether polymers to make the gels.

The polymeric materials which are suitable for use in the practice of the invention include at least one chemically crosslinkable, at least water-dispersible polymer selected from the group consisting of polyacrylamides and related polymers, cellulose ethers, and polysaccharides which can be crosslinked or gelled in an aqueous medium with catalytic gelling agents. Where used, in the specification and in the claims, unless otherwise specified, the term "polymer" is employed generically to include both homopolymers and copolymers, and the term "water-dispersible polymers" is employed to include those polymers which are truly water-soluble and those which are dispersible in water or other aqueous medium to form stable colloidal suspensions which can be crosslinked as described in U.S. Pat. No. 3,785,437, which is incorporated herein by reference. Representative examples of suitable polymers, the preparation of these polymers, and specific polymeric materials that can be employed in the present invention are set forth in said patent.

As set forth in said patent, representative cellulose ethers which can be used in the practice of the present invention include, inter alia, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose, alkylalkyl celluloses such as methylethyl cellulose; and hydroxyalkylalkyl celluloses such as hydroxypropylmethyl cellulose; and the like. Many of said cellulose ethers are available commercially in various grades. Cellulose ethers are commonly designated in practice as CMC-7, CMC-9, CMC-12, etc., wherein the 7, 9, and 12 refer to a degree of substitution of 0.7, 0.9, and 1.2, respectively.

All the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymers having molecular weights as high as 20,000,000 or higher, and meeting said conditions, can be used.

As set forth in said patent, the aqueous gel comprises water to which there has been added a water thickening amount of a water-soluble polymer, a sensible amount of a water-soluble compound of a polyvalent metal wherein the metal present is capable of being reduced to a lower polyvalent state and which is sufficient to gel said polymer when the valence of at least a portion of said metal is reduced to said lower valent state and an amount of water-soluble reducing agent which is effective to reduce at least a portion of said metal to said lower valent state. Representative examples of suitable compounds and amounts of said compounds for producing the aqueous gels are set forth in U.S. Pat. No. 3,785,437.

The amount of such polymers used in the practice of the invention can vary widely depending upon the particular polymer used, the purity of said polymer and properties desired in the resulting aqueous crosslinked compositions. In general, the amount of polymer used in preparing the aqueous compositions will be a water-thickening amount, i.e., at least an amount which will significantly thicken the water to which it is added. Generally speaking, amounts in the range of 0.0025 to 5, preferably 0.01 to 1.5, weight percent, based upon the weight of water or aqueous medium, can be used in the practice of the invention. However, amounts outside these ranges can be employed.

Representative examples of suitable oxidizing components that can be employed include potassium permanganate, sodium permanganate, ammonium dichromate, the alkali metal chromates and dichromates, and chromium trioxide. Sodium dichromate and potassium dichromate, because of low cost and ready availability, are the presently preferred oxidizing components for use in the catalyst systems of the present invention. The hexavalent chromium in the chromium compounds is reduced in situ to trivalent chromium by suitable reducing agents, as discussed hereinafter. In the permanganate compounds, the manganese is reduced from +7 valence to +4 valence.

Suitable agents for use as the reducing component in the practice of the present invention include sulfur-containing compounds such as sodium sulfide, sodium hydrosulfite, sodium metabisulfite, potassium sulfite, sodium bisulfite, potassium metabisulfite, sodium sulfite, sodium thiosulfate, ferrous sulfate, thioacetamide, hydrogen sulfide, including hydrogen sulfide naturally present in the formation being treated, and others; and nonsulfur-containing compounds, such as hydroquinone, ferrous chloride, para-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125° to 130°F. The presently most preferred reducing agents are sodium bisulfite, sodium hydrosulfite or potassium hydrosulfite, and hydrogen sulfide which is a sour gas. Many reservoirs contain the sour gas which would be a suitable reducing agent.

As indicated hereinbefore, the objects of the invention are achieved in selectively blocking and plugging permeable sections of subterranean oil-bearing formations by injecting with steam an aqueous surfactant solution containing a chemically crosslinkable, water-dispersible polymer which prevents the surfactant from foaming until it has been in the formation for some time. The amount of surfactant present in the aqueous solution should be sufficient to form a stable, self-collapsing foam when said solution is contacted with steam after the polymer has broken down due to heat. Generally, the aqueous solution will contain about 0.1 to about 3 weight percent polymer. The amount of surfactant present in the solution will ordinarily be in the range of about 0.1 to about 10 weight percent, preferably 1 percent to 6 percent based on the weight of the water.

The aqueous gels which can be used in combination with the surfactant for injection along with steam will comprise water to which there has been added a water-thickening amount of a water-soluble polymer such as a cellulose ether, a water-soluble compound of a polyvalent metal, and a water-soluble reducing agent. The aqueous gels will preferably contain from 0.5 to 1.5 weight percent of a cellulose ether, based upon the weight of water or aqueous medium, from 0.05 to 60 weight percent of the polyvalent metal compound, based upon the weight of cellulose ether, and from 0.1 to about 200 or more percent of a stoichiometric amount of the reducing agent required to reduce the polyvalent metal to the lower polyvalent state.

As indicated hereinbefore, the cellulose ethers are the presently preferred polymers used for preventing the surfactants from foaming until the surfactants are in the channels of the subterranean formation. Presently, one preferred cellulose ether is sodium carboxymethyl cellulose.

Various types of surface-active agents could be used in the process of my invention, either nonionic, anionic, or cationic. Commercial surface-active agents of the alkyl phenoxy polyethoxy ethanol class and commonly available household cleansers have been tested and found satisfactory in the practice of my invention. The surfactants must be stable at the operating conditions of this invention. For example, Trend detergent, manufactured by Purex Corporation, Ltd., has proved satisfactory, as well as other household cleaning compounds, hand and laundry soaps, and rug shampoos.

Other water-soluble surfactants which have been found stable at temperatures used to carry out this invention are alkylphenoxypoly (ethyleneoxy) ethanol surfactants sold by GAF corporation, Chemical Division, 140 West 51st, New York, N.Y. 10020, as Igepal surfactants. The particular Igepal surfactants are sold under the trade names as DM970, DM730, DM710, and CA720. The aliphatic polyether surfactants sold by the GAF corporation under the trade names Antarax BL330 and BL344 have also been found to be effective water-soluble surfactants usable in carrying out this invention.

Surfactants have been used to produce foams in formations. *Society of Petroleum Engineers Journal*, December 1970: S. H. Raza, "Foam in Porous Media: Characteristics and Potential Applications." Note FIG. 2 and pages 330 and 335. A surfactant solution useful in the present invention is OK liquid (ammonium lauryl sulfate plus amide builder manufactured by Proctor and Gamble) in a water solution at a concentration as low as approximately 0.3 weight percent. Such solutions are referred to in the *Society of Petroleum Engineers Journal* as useful to produce foam in porous media. After the injection of the surfactant solution into the producing well, steam channeling through the introduced solution to reach the producing well will generate a foam consisting of water as the external phase and steam as the gaseous phase. This foam is generated in precisely the porosities through which the undesirable channeling has occurred and therefore a selective blocking is produced forcing the remaining steam to produce oil from less depleted portions of the formation.

The aqueous surfactant solution containing the gelled or ungelled polymer can be introduced into the formation along with steam either through an injection well penetrating the formation and/or a production well penetrating the formation.

The invention is applicable to formations produced by direct steam drive as where there is a steam injection well and a producing well. It is also applicable to the production of a formation using a cyclic or "huff-puff" operation. In any event, when there is being produced from the producing well or during a producing cycle excessive steam and/or hot water, the invention can be applied to substantially plug or seal channelings through which the steam preferentially finds its way, resulting in a production of insufficient oil.

SPECIFIC EXAMPLE

Tests of this invention were performed in apparatus used to simulate steam-foam behavior in porous media using sand packs, surfactant solutions, a polymer, and a metered flow of nitrogen. The sand packs were made of coarse Ottawa sand in plastic tubes 2.8 cm in diameter and 30.1 cm long. The tubes were provided with O-ring seals and stainless steel sand retaining screens. The tubes had a volume of 105 cc and held 305 grams of sand having a pore volume of 60 cc. The packed sand tubes had a permeability of about 1 Darcy.

The sand-packed tubes were supported in a vertical position and the pore space filled with water. Nitrogen from a 100 psi source was metered through a needle valve and admitted to the top of the tube and allowed to displace materials out the bottom of the tube into a collection vessel. A Dynascience Corporation pressure transducer KP15 with a 100 psi diaphragm and a Model D25 translater were used to measure the pressure drop across the sand pack as the material was displaced. The transducer signal was fed to a Sargent Model SR recorder which made time-pressure plots. Tubes carrying gas to the sand packs were made of 1-inch schedule 40 steel pipe.

Test solutions were introduced to the top of the sand packs with a hypodermic syringe, displacing water out the bottom. After injecting either water or a test solution in the pore space, nitrogen was admitted to the top of the pack and a pressure-time record obtained.

The ratio of back pressure for surfactant solution compared to the back pressure of water in the same pack is designated as the resistance factor (RF). RF = ($P_{sol}/P_{H_2O}$). It is taken as a measure of the surfactant's ability to develop a resistance to flow in zones of high permeability. The feature of showing improved resistance to flow when surfactant is used improves uniformity of heat distribution in steam injection wells. Further improvement is shown when polymers are used with the surfactant as will be seen in Tables I and II.

The thermal stability of surfactants was studied by exposing aqueous solutions of surfactants sealed in a closed vessel to temperatures of 325°F for a period of time. The pressure vessels were made of Monel metal rated at 2,000 psi at 600°F. Attached to the vessel was a 3,000 psi pressure gauge, and a 1300 psi rupture disc. These vessels were heated in the laboratory and records made of the vessel's internal temperature with an iron-constantan thermocouple connected to a Leeds Northrup recorder which provided a time-temperature curve, i.e., the rise time and amount of time at which the temperature was maintained substantially constant.

Tests to show the improvement in resistance factor when CMC polymer (ungelled) is used over using surfactant alone are found in the following table. After heating the aqueous CMC-surfactant material, the resistance factor is found to drop. This feature demonstrates that the CMC protects the surfactant while it is being injected, after which the surfactant is released due to breakdown of the polymer exposed to heat of the steam. The resistance factor after heating is due to the foam produced by the surfactant and steam, and the remaining polymer which has not broken down, or to the effect of the polymer-surfactant foam combination.

TABLE I

| Composition | Heat Treatment | Resistance Factor |
|---|---|---|
| 3% Cor 180 surfactant | none | 7.5 |
| 3% Cor 180 in tap water Plus 9000 ppm Na CMC | none | 15.3 |
| " | 3 hrs/325°F | 5.93 |
| " | " | 6.0 |
| " | " | 8.1 |

The viscosity of 3% Cor 180 in tap water was 6.0 cp. The viscosity of 3% Cor 180 in tap water plus 0.9% NaCMC was 57.2 cp. After heating the 3% Cor 180 plus 0.9% NaCMC in tap water for three hours at 325°F, the viscosity was reduced to 10.2 cp. Table I shows the use of surfactant alone compared to surfactant in ungelled CMC, both not being heated. It further compares the resistance factor for surfactant in ungelled CMC in three samples heated to 325°F for three hours to the resistance factor of the same material before being heated.

the formation. This allows for greater and better use of surfactants in the gelled polymer-condensible foam treatment of wells for diversion purposes and thus causes steam to go to zones containing the oil remaining in the reservoir and, further, according to the data in Table II, even after exposure to higher temperatures for a period of time the polymers break down but the resistance factor remains higher than it would have been if surfactants alone were used in the steam injection project.

Cor 180 is a formulation of surfactant prepared for Chemical Oil Recovery Corporation, P.O. Box 9027, Bakersfield, CA 93309. An analysis of Cor 180 is as follows:

The volatile components evaporated off amounted to 59.6 weight percent of the surfactant which was largely water. The elemental analysis of the remaining solid portion was as follows:

| Element | Weight % |
|---|---|
| Na | 2.8 |
| C | 50.1 |
| $H_2$ | 9.8 |
| $N_2$ | 2.2 |
| S | 5.5 |
| $O_2$ | 30.0 |

The total of the percentage of the dry material is 100.4 percent, giving an approximate total of the components making up Cor 180. The CMC used in carrying out the above experiments is CMC-9 (the degree of

TABLE II

Effect of Exposure time at 325°F on Properties of Surfactant and Surfactant-CMC Gel Systems in Tap Water

| Sample Composition | Exposure Time, Hrs. at 325°F[1] | Heated System % Gel | % Liquid | Resistance Factor of Liquid Phase | Remarks |
|---|---|---|---|---|---|
| 3% Cor 180 | 4.8 | | 100 | 4.9 | Cloudy, ppt[3] |
| 3% Cor 180 in Gel[2] | 4.8 | 50 | 50 | 7.7 | |
| 3% Cor 180 | 4.9 | | 100 | 9.3 | Cloudy, ppt[3] |
| 3% Cor 180 in Gel[2] | 4.9 | 75 | 25 | 100 | |
| 3% Cor 180 | 7.8 | | 100 | — | |
| 3% Cor 180 in Gel[2] | 7.8 | none | 100 | 6.5 | |
| 3% Cor 180 | 8.8 | | 100 | — | |
| 3% Cor 180 in Gel[2] | 8.8 | none | 100 | 7.7 | |
| 3% Cor 180 | 9.0 | | 100 | 1.2 | |
| 3% Cor 180 in Gel[2] | 9.0 | none | 100 | 5.7 | |

[1]Time sample is in the temperature range 293–325°F.
[2]Gel is made from 10,000 ppm CMC, 3000 ppm $K_2Cr_2O_7.2H_2O$, 4000 ppm $Na_2S_2O_4$ and 3% Cor 180.
[3]Cor 180 solutions become cloudy in heating and may also contain a precipitate and an oil layer floating on the top of the water phase.

Table II represents results of tests wherein the surfactant plus gelled CMC is exposed to heating at 325°F from 4.8 hours to 9.0 hours. According to the table, the gelled CMC breaks down after about 4.9 hours or certainly before 7.8 hours, but the resistance factor wherein gelled CMC was placed remains higher than that experienced when the surfactant solution alone was used. This feature is particularly beneficial in steam injection wells since the longer the resistance factor persists, the more the diversion of the steam to zones containing oil results, with less of the steam going into channels and bypassing the oil zones. The gelled polymers when used with surfactants in steam injection flooding perform two purposes in that the surfactants are prevented from foaming due to being coated by the gelled polymers around the surfactant materials during the injection, and the surfactants do not degrade due to the heat from the steam while they are coated with the gelled polymers during injection down the well and into substitution is 0.9; in actual tests the degree of substitution has been found to be 0.95).

I claim:
1. A process for improving the production of oil from an oilbearing formation by pressure of steam therein which is channeling undesirably from a steam injection well into a production well owing to channeling in said formation which comprises:
   a. injecting into said channels of said formation an aqueous fluid containing a water-thickening amount of at least one crosslinkable polymeric material selected from water-dispersible polyacrylamides, cellulose ethers, and polysaccharides and a surfactant which will foam when contacted with steam, said surfactant being present in sufficient quantities to form a stable, self-collapsing foam when said solution is contacted with steam,
   b. injecting steam downwardly through the injection well and outwardly through the formation into contact with said aqueous solution in said channels thereby causing said polymeric material to be broken down by heat which then allows the steam to form a relatively stable foam having steam as the gas phase in said channels and thereby plug same and thus producing a selective blocking which forces the remaining steam to produce oil from less depleted portions of the formation, and c. continuing to inject steam through the formation to produce oil from the less depleted portions of the formation.

2. A process according to claim 1 wherein said aqueous fluid is an aqueous gel comprising water to which there has been added:

a water-thickening amount of at least one of said polymeric materials;

a water-soluble compound of a polyvalent metal, wherein the valence state of the metal therein is capable of being reduced to a lower polyvalent valence state, in an amount which is sufficient to cause gelation of said water containing said polymeric material when the valence of at least a portion of said metal is reduced to said lower valence state; and a water-soluble reducing agent in an amount which is effective to reduce at least a portion of said metal to said lower valence state and cause said gelation with the formation of said gel.

3. A process according to claim 1 wherein said polymeric material is a cellulose ether.

4. A process according to claim 1 wherein the aqueous fluid of step (a) is injected into the formation through a production well along with steam.

5. A process according to claim 1 wherein there is also introduced into said injection well along with said steam a surfactant at about the same time as said aqueous solution is introduced into a production well.

6. A process for decreasing the permeability of a subterranean oilbearing formation penetrated by at least one injection well and at least one producing well spaced from said injection well and producing oil from the formation which comprises:

a. injecting steam through an injection well and/or production well into a formation, together with an aqueous surfactant solution containing a chemically crosslinkable, water-dispersible polymer which is present in an amount sufficient to prevent the surfactant from foaming until the surfactant is in the formation and after the polymer breaks down due to heat in the formation;

b. injecting steam downwardly through an injection well and outwardly through the formation into contact with the aqueous surfactant solution containing polymer to heat the polymer for a period of time sufficient to break down the polymer which allows activation of the surfactant and production of foam having a condensible gas as its gaseous phase which selectively blocks the more depleted portions of the formation and forces the remaining steam to produce oil from the less depleted portions of the formation; and c. continuing to inject steam through the formation to produce oil from the less depleted portions of the formation.

7. A process according to claim 6 wherein said polymer is a gelled or ungelled cellulose ether polymer and the amount of surfactant present in the aqueous solution is sufficient to form a stable, self-collapsing foam after said solution is contacted with steam for a period of time sufficient to break down the foam and activate the surfactant.

* * * * *